United States Patent
Peng (10) Patent No.: US 11,558,253 B2
(45) Date of Patent: Jan. 17, 2023

(54) DATA PROCESSING METHOD AND APPARATUS, AND COMPUTING NODE FOR UPDATING CONTAINER IMAGES

(71) Applicant: HUAWEI TECHNOLOGIES CO., LTD., Guangdong (CN)

(72) Inventor: Xihan Peng, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/198,367

(22) Filed: Mar. 11, 2021

(65) Prior Publication Data
US 2021/0203554 A1   Jul. 1, 2021

Related U.S. Application Data

(63) Continuation of application No. PCT/CN2019/094143, filed on Jul. 1, 2019.

(30) Foreign Application Priority Data

Sep. 12, 2018 (CN) .......................... 201811061918.1

(51) Int. Cl.
*H04L 41/084* (2022.01)
*H04L 41/0826* (2022.01)
(Continued)

(52) U.S. Cl.
CPC ...... *H04L 41/0846* (2013.01); *H04L 41/0826* (2013.01); *H04L 41/0893* (2013.01);
(Continued)

(58) Field of Classification Search
CPC . H04L 41/08–0896; H04L 41/50–5096; H04L 41/0846; H04L 41/0826;
(Continued)

(56) References Cited

U.S. PATENT DOCUMENTS 6,681,389 B1 * 1/2004 Engel ...................... G06F 8/656
                                                              717/173
8,024,724 B2 * 9/2011 Garrison Stuber ....... G06F 8/61
                                                              717/172
(Continued)

FOREIGN PATENT DOCUMENTS

CN    102265568 A    11/2011
CN    103095597 A    5/2013
(Continued)

OTHER PUBLICATIONS

Yamasaki, Shohei, Naoya Maruyama, and Satoshi Matsuoka. "Model-based resource selection for efficient virtual cluster deployment." Proceedings of the 2nd international workshop on Virtualization technology in distributed computing. 2007. (Year: 2007).*

(Continued)

*Primary Examiner* — Mohamed A. Wasel (57) ABSTRACT

A data processing method and apparatus are disclosed. The data processing method includes: receiving, by a first edge computing node in an edge computing cluster, a container image update instruction; obtaining, by the first edge computing node, a to-be-updated container image; and sending, by the first edge computing node, the to-be-updated container image to another edge computing node in the edge computing cluster. The first edge computing node is an edge computing node in the edge computing cluster, the edge computing cluster includes at least two edge computing nodes, and the container image update instruction is used to instruct the at least two edge computing nodes in the edge computing cluster to update a container image. In this way, the time required for downloading the container image is reduced.

21 Claims, 5 Drawing Sheets

(51) Int. Cl.
*G06F 8/65* (2018.01)
*H04L 41/00* (2022.01)
*H04L 41/0893* (2022.01)
*H04L 41/14* (2022.01)
*H04L 41/5003* (2022.01)

(52) U.S. Cl.
CPC .......... *H04L 41/14* (2013.01); *H04L 41/5003* (2013.01); *G06F 8/65* (2013.01); *H04L 41/20* (2013.01)

(58) Field of Classification Search
CPC ..... H04L 41/20; H04L 41/14; H04L 41/5003; H04L 41/0893; G06F 8/60–66; G06F 8/65
See application file for complete search history.

(56) References Cited

U.S. PATENT DOCUMENTS

| | | | | |
|---|---|---|---|---|
| 8,782,632 | B1* | 7/2014 | Chigurapati | G06F 8/656 717/172 |
| 8,898,668 | B1* | 11/2014 | Costea | G06F 8/65 718/100 |
| 9,207,930 | B2* | 12/2015 | Srivas | G06F 16/275 |
| 9,753,718 | B1* | 9/2017 | Carter | G06F 16/183 |
| 10,007,509 | B1* | 6/2018 | Qureshi | G06F 8/65 |
| 10,095,507 | B1* | 10/2018 | Naganathan | H04M 7/006 |
| 10,481,896 | B2* | 11/2019 | Rocci | G06F 13/36 |
| 10,841,152 | B1* | 11/2020 | Humphreys | G06F 9/45558 |
| 2001/0037306 | A1* | 11/2001 | Yoshii | G06Q 30/02 705/54 |
| 2002/0078133 | A1* | 6/2002 | Nagano | H04L 67/1019 709/201 |
| 2002/0152290 | A1* | 10/2002 | Ritche | H04L 29/06 709/244 |
| 2002/0156650 | A1* | 10/2002 | Klein | G06Q 10/10 705/2 |
| 2003/0046529 | A1* | 3/2003 | Loison | H04L 69/329 713/2 |
| 2003/0110248 | A1* | 6/2003 | Ritche | H04L 41/0613 709/224 |
| 2006/0085564 | A1* | 4/2006 | Bomhoff | G06F 8/65 710/8 |
| 2006/0159090 | A1* | 7/2006 | Chang | H04L 12/1868 370/390 |
| 2006/0190939 | A1* | 8/2006 | Chen | G06F 8/65 717/168 |
| 2007/0143390 | A1* | 6/2007 | Giambalvo | G06F 8/65 709/200 |
| 2007/0168919 | A1* | 7/2007 | Henseler | G06F 8/61 717/101 |
| 2007/0300220 | A1* | 12/2007 | Seliger | G06F 8/63 718/1 |
| 2009/0006421 | A1* | 1/2009 | Pantos | H04L 67/32 |
| 2009/0119177 | A1* | 5/2009 | John | G06Q 30/02 705/14.54 |
| 2009/0119655 | A1* | 5/2009 | Quilty | H04W 24/04 717/168 |
| 2009/0157797 | A1* | 6/2009 | Chang | H04L 12/1868 709/219 |
| 2010/0070962 | A1* | 3/2010 | Sinn | G06Q 30/02 717/171 |
| 2010/0162036 | A1* | 6/2010 | Linden | G06F 11/181 714/4.11 |
| 2011/0078675 | A1* | 3/2011 | Van Camp | G06F 8/65 717/170 |
| 2011/0161468 | A1* | 6/2011 | Tuckey | H04L 41/0803 709/224 |
| 2011/0167154 | A1* | 7/2011 | Bush | H04L 41/0893 709/224 |
| 2011/0265082 | A1* | 10/2011 | Ashok | G06F 9/45533 718/1 |
| 2011/0271275 | A1* | 11/2011 | Ochi | G06F 8/63 717/177 |
| 2012/0005346 | A1* | 1/2012 | Burckart | G06F 9/45533 709/226 |
| 2012/0054734 | A1* | 3/2012 | Andrews | G06F 8/65 717/171 |
| 2012/0159469 | A1* | 6/2012 | Laor | G06F 8/65 717/173 |
| 2012/0266170 | A1* | 10/2012 | Zimmerman | G06F 9/45558 718/1 |
| 2013/0145367 | A1* | 6/2013 | Moss | H04L 41/0896 718/1 |
| 2013/0198343 | A1 | 8/2013 | Barsness et al. | |
| 2013/0263131 | A1* | 10/2013 | Beda, III | G06F 9/5011 718/1 |
| 2013/0290694 | A1* | 10/2013 | Civilini | H04L 41/0806 713/2 |
| 2014/0089912 | A1* | 3/2014 | Wang | G06F 8/65 717/173 |
| 2014/0181949 | A1* | 6/2014 | Hunter | G06F 11/3006 726/11 |
| 2014/0298091 | A1* | 10/2014 | Carlen | H04L 65/80 714/15 |
| 2015/0120887 | A1* | 4/2015 | Hu | G06F 8/61 709/220 |
| 2015/0236902 | A1* | 8/2015 | Alam | H04L 41/082 709/221 |
| 2015/0236907 | A1* | 8/2015 | Popli | H04L 47/70 709/226 |
| 2015/0271014 | A1* | 9/2015 | Madama | H04L 41/0893 709/222 |
| 2015/0277856 | A1* | 10/2015 | Payne | G06F 7/588 708/250 |
| 2015/0331707 | A1* | 11/2015 | Hellkvist | H04L 47/827 718/1 |
| 2015/0341456 | A1* | 11/2015 | Chiu | H04L 67/26 709/219 |
| 2015/0363178 | A1* | 12/2015 | Houliston | G06F 8/60 717/178 |
| 2016/0103675 | A1* | 4/2016 | Aabye | G06F 8/65 717/170 |
| 2016/0203008 | A1* | 7/2016 | Cui | G06F 15/173 718/1 |
| 2016/0344582 | A1* | 11/2016 | Shivanna | G06F 11/3072 |
| 2017/0034309 | A1* | 2/2017 | Duan | G06F 8/65 |
| 2017/0075892 | A1 | 3/2017 | Venkataraman et al. | |
| 2017/0123780 | A1* | 5/2017 | Albot | G06F 8/654 |
| 2017/0142228 | A1* | 5/2017 | Byrne | H04L 41/082 |
| 2017/0195448 | A1* | 7/2017 | Su | H04N 21/433 |
| 2017/0208138 | A1* | 7/2017 | Baxter | H04L 61/1511 |
| 2017/0220329 | A1* | 8/2017 | Yang | G06F 8/60 |
| 2017/0230239 | A1* | 8/2017 | Zhang | H04L 41/0859 |
| 2017/0249374 | A1* | 8/2017 | Parees | G06F 9/44 |
| 2017/0257297 | A1* | 9/2017 | Mathew | H04L 41/0893 |
| 2017/0264493 | A1* | 9/2017 | Cencini | H04L 67/1008 |
| 2017/0279877 | A1* | 9/2017 | Chang | H04L 67/1008 |
| 2017/0279881 | A1* | 9/2017 | Chang | H04L 65/4084 |
| 2017/0310742 | A1* | 10/2017 | Jain | H04W 4/08 |
| 2017/0329980 | A1* | 11/2017 | Hu | G06F 21/78 |
| 2018/0046457 | A1* | 2/2018 | Branca | G06F 21/577 |
| 2018/0048545 | A1* | 2/2018 | Mishalov | G06F 11/3075 |
| 2018/0052675 | A1 | 2/2018 | Ghosh et al. | |
| 2018/0145960 | A1* | 5/2018 | Bakshan | H04L 63/20 |
| 2018/0150316 | A1* | 5/2018 | Oh | G06F 9/485 |
| 2018/0173502 | A1* | 6/2018 | Biskup | G06F 8/71 |
| 2018/0173573 | A1* | 6/2018 | Navasivasakthivelsamy | G06F 9/461 |
| 2018/0270291 | A1* | 9/2018 | Burton | H04L 43/0876 |
| 2018/0276215 | A1* | 9/2018 | Chiba | H04L 67/51 |
| 2018/0293152 | A1* | 10/2018 | Sherafat Kazemzadeh | G06F 11/368 |
| 2018/0324204 | A1* | 11/2018 | McClory | G06F 8/30 |
| 2018/0331891 | A1* | 11/2018 | Zhao | H04L 67/34 |
| 2018/0349168 | A1* | 12/2018 | Ahmed | G06F 11/3452 |
| 2018/0373517 | A1* | 12/2018 | Hu | H04L 67/34 |
| 2018/0375936 | A1* | 12/2018 | Chirammal | H04L 67/1097 |
| 2019/0037337 | A1* | 1/2019 | Ahmed | G06F 8/65 |

(56) References Cited

U.S. PATENT DOCUMENTS

| | | | |
|---|---|---|---|
| 2019/0087176 A1* | 3/2019 | Krishnappa | G06F 16/907 |
| 2019/0095253 A1* | 3/2019 | Curtis | H04L 41/5058 |
| 2019/0102265 A1* | 4/2019 | Ngo | H04L 41/0803 |
| 2019/0140905 A1* | 5/2019 | Vembuli | G06F 9/5077 |
| 2019/0155613 A1* | 5/2019 | Olderdissen | G06F 21/53 |
| 2019/0171435 A1* | 6/2019 | Pande | H04L 41/082 |
| 2019/0171438 A1* | 6/2019 | Franchitti | G06F 16/9538 |
| 2019/0171442 A1* | 6/2019 | Machida | H04L 67/1031 |
| 2019/0199828 A1* | 6/2019 | Cannon | H04W 84/18 |
| 2019/0199830 A1* | 6/2019 | Cannon | H04W 84/18 |
| 2019/0213004 A1* | 7/2019 | Zhu | G06F 8/71 |
| 2019/0220271 A1* | 7/2019 | Olderdissen | G06F 8/654 |
| 2019/0340167 A1* | 11/2019 | Raman | G06F 16/2336 |
| 2019/0347121 A1* | 11/2019 | Luo | G06F 9/542 |
| 2019/0356498 A1* | 11/2019 | Hernandez Sanchez | H04L 43/0894 |
| 2019/0394093 A1* | 12/2019 | Kulkarni | G06F 16/116 |
| 2020/0015320 A1* | 1/2020 | Pei | H04W 24/02 |
| 2020/0026505 A1* | 1/2020 | Olderdissen | G06F 9/44526 |
| 2020/0081999 A1* | 3/2020 | Mueller | H04L 67/108 |
| 2020/0117434 A1* | 4/2020 | Biskup | G06F 11/3688 |
| 2020/0218580 A1* | 7/2020 | Kim | G06F 9/5077 |
| 2020/0382365 A1* | 12/2020 | Verma | H04L 63/0272 |

FOREIGN PATENT DOCUMENTS

| | | |
|---|---|---|
| CN | 105553737 A | 5/2016 |
| CN | 105827678 A | 8/2016 |
| CN | 106888254 A | 6/2017 |
| CN | 107105029 A | 8/2017 |
| CN | 107577475 A | 1/2018 |
| CN | 107819802 A | 3/2018 |
| CN | 108509276 A | 9/2018 |
| WO | 2008069439 A1 | 6/2008 |
| WO | 2016181462 A1 | 11/2016 |
| WO | 2018020610 A1 | 2/2018 |

OTHER PUBLICATIONS

Lee, Choonhwa, Hyungseock Lee, and Eunsam Kim. "Speeding up VM image distribution for cloud data centers." Advances in Electrical and Computer Engineering 16.4 (2016): 9-14. (Year: 2016).*

Office Action issued in CN201811061918.1, dated Jul. 23, 2020, 8 pages.

International Search Report and Written Opinion issued in PCT/CN2019/094143, dated Sep. 18, 2019, 8 pages.

Claus Pahl et al., "Containers and Clusters for Edge Cloud Architectures—a Technology Review", 2015 3rd International Conference on Future Internet of Things and Cloud, Aug. 24, 2015, total 8 pages.

Extended European Search Report issued in EP 19861097.4, dated Sep. 14, 2021, total 8 pages.

Office Action issued in JP2021-513834 dated May 24, 2022, 8 pages.

* cited by examiner

DATA PROCESSING METHOD AND APPARATUS, AND COMPUTING NODE FOR UPDATING CONTAINER IMAGES

CROSS-REFERENCE TO RELATED APPLICATIONS

This application is a continuation of International Patent Application No. PCT/CN2019/094143, filed on Jul. 1, 2019, which claims priority to Chinese Patent Application No. 201811061918.1, filed on Sep. 12, 2018. The disclosures of the aforementioned applications are hereby incorporated by reference in their entireties.

TECHNICAL FIELD

This application relates to the communications field, and in particular, to a data processing method and apparatus, and a computing node.

BACKGROUND

In a network topology of an edge computing scenario, a plurality of edge computing nodes form an edge computing cluster. The edge computing cluster is connected to a remote data center through a network switching device, and each edge computing node in the edge computing cluster may be connected to one or more sensors. In this way, after collecting data, the sensor first transmits the data to the edge computing node, and the edge computing node processes the data and sends a processing result to the data center.

In the network topology, software used to process the data collected by the sensor runs on each edge computing node, and is deployed in a container in an image manner. The software may be referred to as a container image. The data center usually needs to upgrade container images running on some edge computing nodes in the network topology. During the upgrade, the data center sends, to an edge computing cluster that needs to be upgraded, a request message that includes an identifier of a to-be-upgraded container image. Each edge computing node in the edge computing cluster downloads, from the data center, the container image corresponding to the identifier, to upgrade the to-be-upgraded container image.

In a process of implementing this application, the inventor found that a conventional technology has at least the following problems.

Currently, when a network bandwidth between a network switching device and a data center is limited, and when a plurality of edge computing nodes connected to the network switching device need to download a container image, due to the limitation on the network bandwidth, the plurality of edge computing nodes may need a relatively long time to download the container image from the data center.

SUMMARY

To resolve a problem in a conventional technology that a process of downloading a container image consumes a long time because a network bandwidth between an edge computing node and a data center is limited, example embodiments of this application provide a data processing method and apparatus, and a computing node. The technical solutions are described as follows.

According to a first aspect, an embodiment of this application provides a data processing method. In the method, an edge computing cluster includes at least two edge computing nodes, and any edge computing node in the edge computing cluster is referred to as a first edge computing node for ease of description. The first edge computing node receives a container image update instruction, where the container image update instruction is used to instruct the at least two edge computing nodes in the edge computing cluster to update a container image, obtains a to-be-updated container image, and sends the to-be-updated container image to another edge computing node in the edge computing cluster. Because edge computing nodes in the edge computing cluster are located in a same local area network, a network bandwidth between any two nodes in the edge computing cluster is relatively large. In this way, the first edge computing node can quickly send the container image to another edge computing node, to reduce the time required by each edge computing node in the edge computing cluster to obtain the container image.

In an embodiment, after the first edge computing node receives the container image update instruction, the first edge computing node selects an edge computing node from the edge computing cluster as an agent node. After the agent node is selected, the container image may be downloaded from a data center by using the agent node, so that the agent node may exclusively occupy a network bandwidth between the edge computing cluster and the data center, to reduce the time required by the agent node to download the container image. Then, the agent node sends the container image to another agent node, to reduce the time required by each edge computing node in the edge computing cluster to obtain the container image.

In another embodiment, the first edge computing node obtains a performance parameter of each edge computing node in the edge computing cluster, where the performance parameter is used to indicate resource usage of each edge computing node, determines load of each edge computing node based on the performance parameter of each edge computing node, sorts edge computing nodes in the edge computing cluster based on the load of each edge computing node, and selects an edge computing node with the lowest load as the agent node. Because the edge computing node with the lowest load is selected as the agent node, the agent node has the fastest speed of downloading the container image from the data center, to minimize the time required by the agent node to download the container image.

In another embodiment, when the first edge computing node is used as the agent node in the edge computing cluster, obtaining the to-be-updated container image, where the first edge computing node is an edge computing node with the lowest load. Because the first edge computing node is the edge computing node with the lowest load, the first edge computing node has the fastest speed of obtaining the container image, to minimize the time required by the first edge computing node to obtain the container image.

In another embodiment, the first edge computing node randomly selects an edge computing node from the edge computing cluster as the agent node, or selects an edge computing node from the edge computing cluster as the agent node based on an identifier of the edge computing node.

In another embodiment, when the agent node is not the first edge computing node, the first edge computing node obtains the to-be-updated container image from the agent node, where the to-be-updated container image is obtained by the agent node from the data center. Because the first edge computing node and the agent node are located in a same local area network, a network bandwidth between the first edge computing node and the agent node is relatively large.

In this way, the first edge computing node can quickly obtain the container image from the agent node, to reduce the time required for obtaining the container image.

In another embodiment, each edge computing node in the edge computing cluster is connected to the data center through a network switching device.

According to a second aspect, an embodiment of this application provides a data processing apparatus, configured to perform the method in the first aspect or any embodiment of the first aspect. Specifically, the apparatus includes units configured to perform the method in the first aspect or any embodiment of the first aspect.

According to a third aspect, an embodiment of this application provides a computing node, including a processor, a memory, a communications interface, and a bus, where the processor, the memory, and the communications interface are connected and communicate with each other through the bus, the memory is configured to store one or more computer readable instructions, and when the computing node runs, the processor executes the one or more computer readable instructions in the memory to perform the operation steps of the method in the first aspect or any embodiment of the first aspect by using a hardware resource in the computing node.

According to a fourth aspect, an embodiment of this application provides a data processing system, where the system includes a data center and at least one edge computing node, and the edge computing node and the data center are configured to perform operation steps of the method performed by the data center and the computing node when the data center and the computing node are execution bodies in the first aspect or any embodiment of the first aspect.

According to a fifth aspect, an embodiment of this application provides a computer program product, where the computer program product includes a computer program stored in a computer-readable storage medium, and the computer program is loaded by a processor to implement the method in the first aspect or any embodiment of the first aspect.

According to a sixth aspect, an embodiment of this application provides a non-volatile computer-readable storage medium, configured to store a computer program, where the computer program is loaded by a processor to execute one or more instructions in the first aspect or any embodiment of the first aspect.

According to a seventh aspect, an embodiment of this application provides a chip, where the chip includes a programmable logic circuit and/or one or more program instructions, and when running, the chip is configured to implement the method in the first aspect or any embodiment of the first aspect.

In this application, the implementations provided in the foregoing aspects may be further combined to provide more implementations.

DESCRIPTION OF EMBODIMENTS

The following further describes in detail the embodiments of this application with reference to accompanying drawings.

Figure 1:
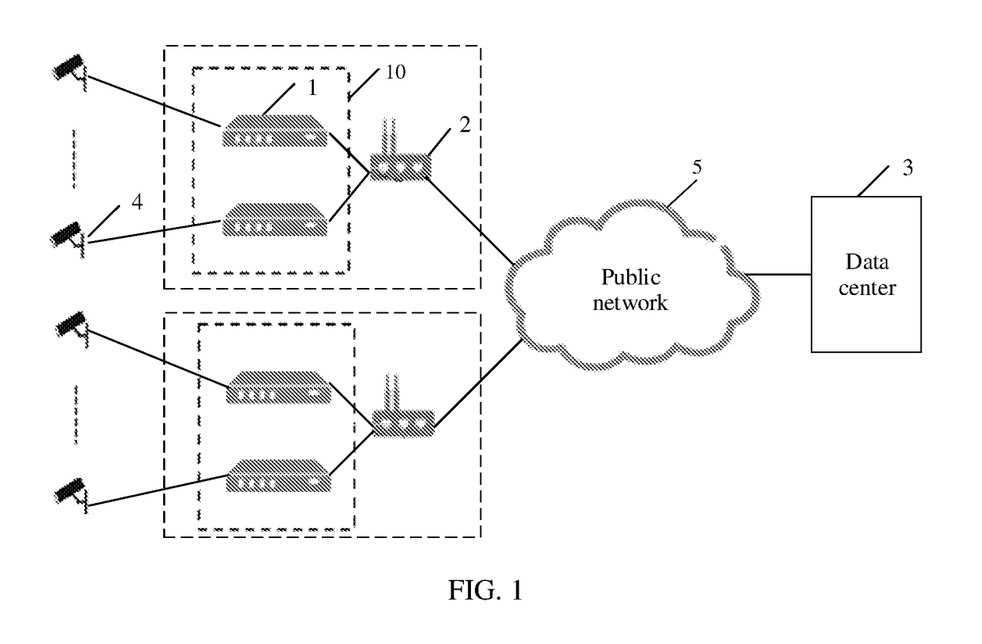
FIG. 1 is a schematic diagram of a network architecture according to an embodiment of this application.

FIG. 1 is a schematic diagram of a network architecture according to an embodiment of this application. The network architecture includes at least one edge computing cluster 10, a network switching device 2 and a data center 3 that corresponds to each edge computing cluster 10, and each edge computing cluster 10 includes at least two edge computing nodes 1. For each edge computing cluster 10, each edge computing node is connected to the network switching device 2 corresponding to the edge computing cluster 10, to form a local area network. The network switching device 2 is connected to a public network 5, and is connected to the remote data center 3 through the public network 5. The public network 5 can be a wired or wireless network. The network switching device 2 includes a wireless router, a wired router, or the like. Any two edge computing nodes 1 in a same local area network are directly connected to each other or connected to each other through the switch, and the network bandwidth between any two edge computing nodes 1 is relatively large and is greater than the network bandwidth between the network switching device 2 and the data center 3.

Each edge computing node 1 includes at least one container, a container image is deployed in the container, and the container image includes software, an application, a data analysis algorithm model, or the like that is used to process data.

Optionally, the container image in the edge computing node 1 may be deployed on the edge computing node 1 when the edge computing node 1 is delivered from a factory, or may be installed on the edge computing node 1 after the edge computing node 1 is delivered from a factory.

Optionally, referring to FIG. 1, the edge computing node 1 may further be connected to at least one collection device 4. The edge computing node 1 may process, by using the container image included in the edge computing node 1, data collected by the at least one collection device 4, and then send a processing result to the data center 3. Alternatively, the edge computing node 1 may process, by using the container image included in the edge computing node 1, data that is received by the edge computing node 1 and that is sent by the data center, and then send a processing result to the data center 3.

The network architecture shown in FIG. 1 may be used in a current field of intelligent transportation or security protection. For example, in the field of security protection, the collection device 4 may be a camera, and the edge computing node 1 may include a container image used to extract a face model. In this way, the camera may shoot a frame of video picture, and each time a frame of video picture is shot, the video picture may be sent to the edge computing node 1 connected to the camera. The edge computing node 1 receives the video picture, detects, by using the container image included in the edge computing node 1, whether the video picture includes a face image, and if the video picture includes the face image, extracts a face model corresponding to the face image, and sends the face model to the data center.

Maintenance personnel may periodically or aperiodically develop a new version of the container image. In this case, the container image in the edge computing node 1 needs to be upgraded to the new version. Currently, a user stores a new version of a developed container image in a data warehouse of the data center, and the edge computing node 1 that needs to be upgraded may download the new version of the container image from the data center, and upgrade a locally stored old version of the container image to the new version of the container image.

Figure 2:
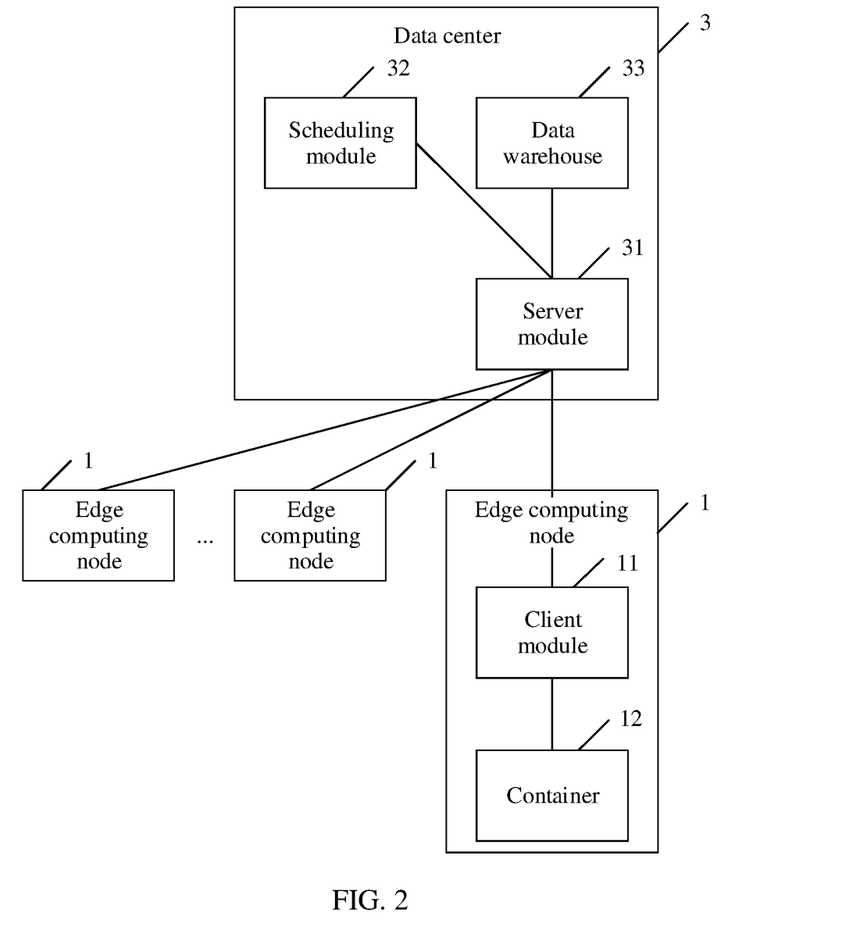
FIG. 2 is a schematic diagram of a K8S architecture according to an embodiment of this application.

The network architecture shown in FIG. 1 is a hardware topology structure. This application further provides a software architecture diagram shown in FIG. 2. The software architecture diagram describes in detail a software architecture of the data center 3 and a software architecture of the edge computing node 1 in the network architecture shown in FIG. 1. FIG. 2 shows a software architecture. The software architecture is a schematic diagram of a K8S architecture. Referring to FIG. 2, in the K8S architecture, the data center 3 includes functional modules such as a server module 31, a scheduling module 32, and a data warehouse 33, and each edge computing node 1 includes functional modules such as a client module 11 and a container 12. The data center 3 and the edge computing node 1 may use a client/server (CS) working mode. The data center 3 interacts with the edge computing node 1 by running the server module 31, and the edge computing node 1 interacts with the data center 3 by running the client module 11. In an interaction process, the data center 3 functions as a server, and the edge computing node 1 functions as a client. The data warehouse is configured to store a new version of a container image developed by a user, and the scheduling module 32 is configured to schedule an edge computing cluster 10 whose container image needs to be upgraded. The edge computing node 1 in the scheduled edge computing cluster 10 may download the container image from the data warehouse 33 in the data center 3, and deploy the container image in the container 12 in an image manner, to implement upgrade.

Figure 3:
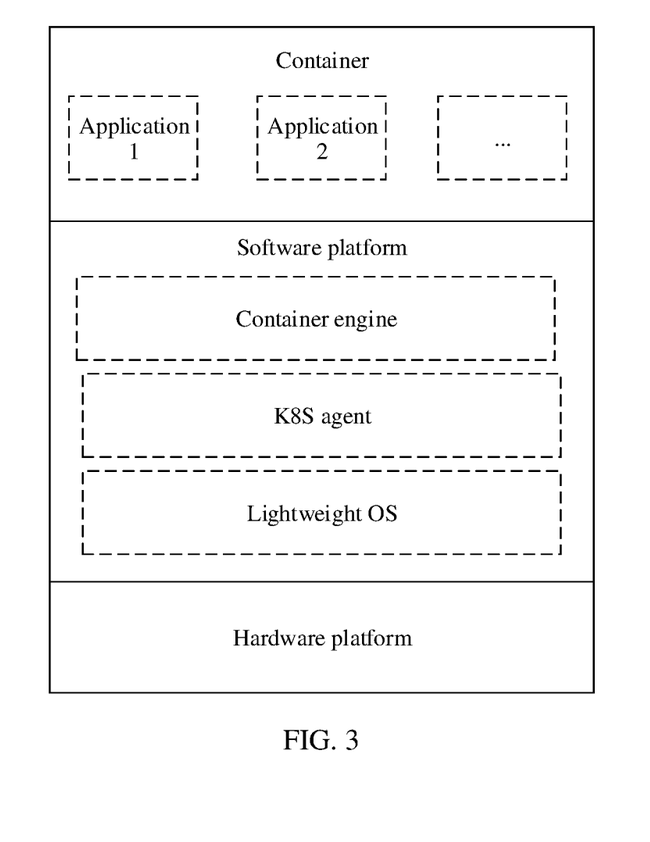
FIG. 3 is a schematic diagram of a structure of a software stack of an edge computing node according to an embodiment of this application.

FIG. 3 is a schematic diagram of a structure of a software stack of an edge computing node 1 based on the software architecture shown in FIG. 2 according to an embodiment of this application. As shown in the figure, the edge computing node 1 includes a container, a software platform for running a container image, and a hardware platform for running the software platform. The container includes a container image, and the container image may be an algorithm, software, an application, or the like. The software platform includes functional modules such as a container engine, a K8S agent, and a lightweight operating system (OS). The hardware platform includes hardware resources such as a processor, a memory, and a network interface card.

The lightweight OS may be configured to allocate a hardware resource to the container engine and the K8S agent. The hardware resource may be a hardware resource such as a processor, a memory, and/or a network interface card of the hardware platform. The container engine may be configured to run the container image of the container, and obtain a processing result by processing data using the container image. The K8S agent is an instance of a client module, and may be configured to interact with the data center 3. For example, the K8S agent may send the processing result to the data center 3, or download a new version of a container image from the data center 3 and deploy the new version of the container image in the container, to implement operations such as upgrading the container image.

Because each edge computing node 1 in the edge computing cluster 10 is connected to the network switching device 2, the time required by each edge computing node 1 in the edge computing cluster 10 to download the container image from the data center 3 depends on the network bandwidth between the network switching device 2 and the data center 3. In other words, a larger network bandwidth between the network switching device 2 and the data center 3 indicates a shorter time required by each edge computing node 1 in the edge computing cluster 10 to download the container image. On the contrary, a smaller network bandwidth between the network switching device 2 and the data center 3 indicates a longer time required by each edge computing node 1 in the edge computing cluster 10 to download the container image. For example, a size of the container image that needs to be downloaded is 200 MB, the network bandwidth between the network switching device 2 and the data center 3 is 4 Mbps, and the edge computing cluster 10 includes four edge computing nodes 1. In this way, the time required by the four edge computing nodes 1 to download the container image is T1=(200×8×4)/4=1600S. When a network switching device 2 corresponding to an edge computing cluster 10 is connected to the data center 3 through a wireless network, or when a network bandwidth of a wired connection between a network switching device 2 corresponding to an edge computing cluster 10 and the data center 3 is relatively small, the network bandwidth between the network switching device 2 and the data center 3 is limited, and the time required by each edge computing node 10 in the edge computing cluster 10 to download the container image is relatively long. To resolve this technical problem, any one of the following implementations may be used.

Figure 4:
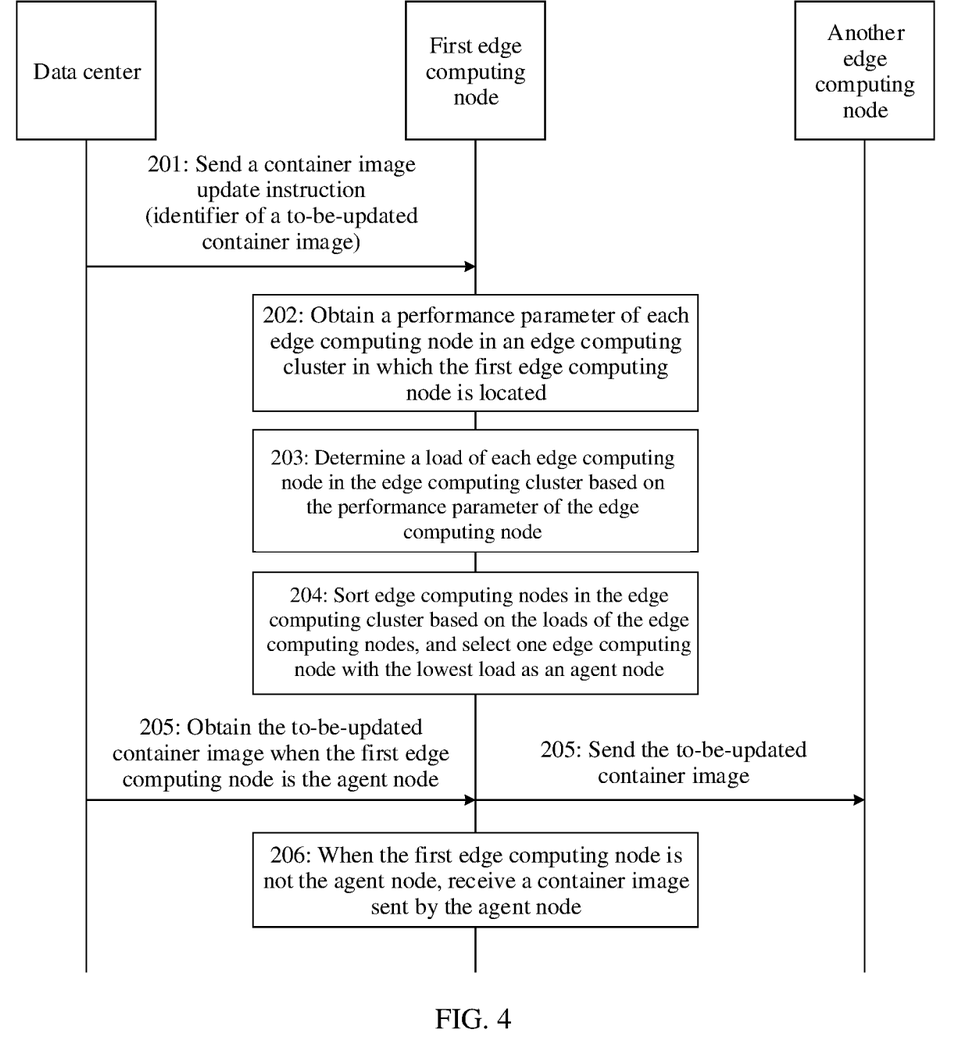
FIG. 4 is a flowchart of a data processing method according to an embodiment of this application.

The following further describes, with reference to FIG. 4, a data processing method provided in this application. As shown in the figure, the method may be applied to the network architecture shown in FIG. 1, and includes the following steps.

Step 201: A data center sends a container image update instruction to an edge computing cluster, where the container image update instruction includes an identifier of a to-be-updated container image.

A user may develop a new version of a container image, and store the new version of the container image in the data center. The new version of the container image is the to-be-updated container image. The container image may be software, an application, a data analysis algorithm model, or the like. Therefore, the to-be-updated container image may be a new version of software, an application, a data analysis algorithm model, or the like.

After developing the new version of the container image, the user stores the new version of the container image in a data warehouse in the data center. A server module of the data center may detect the container image stored in the data warehouse, use the container image as the to-be-updated container image, and send a scheduling instruction to a scheduling module of the data center. Alternatively, after storing the new version of the container image in the data warehouse of the data center, the user may input an upgrade command including the identifier of the container image to the server module of the data center. After receiving the upgrade command, the data center sends the scheduling instruction to the scheduling module of the data center.

Then, the scheduling module in the data center may schedule at least one edge computing cluster. The server module generates the container image instruction, and sends the container image instruction to each scheduled edge computing cluster. The container image instruction includes the identifier of the to-be-updated container image.

Optionally, the data center may send the container image instruction to the scheduled edge computing cluster in any one of the following manners.

In a first manner, the container image instruction may be simultaneously sent to each scheduled edge computing cluster.

In a second manner, the container image instruction may be sent to the scheduled edge computing cluster in batches based on a time sequence. Any two adjacent time intervals for sending the container image instruction may be equal or unequal.

For example, it is assumed that there are nine scheduled edge computing clusters and the container image update instruction is sent in three times. The container image update instruction is sent to three scheduled edge computing clusters for the first time, after a time period, the container image update instruction is sent to other three scheduled edge computing clusters for the second time, and after another time period, the container image update instruction is sent to remaining three scheduled edge computing clusters for the third time.

Optionally, a time length of the time period waited for each time may be equal or may be unequal. When the time length of the time period waited for each time is equal, the time length may be a preset time length or a time length set by the data center.

Compared with the first manner, in the second manner, a quantity of edge computing nodes that simultaneously request to download data from the data warehouse in the data center may be reduced, to reduce pressure on the data center, and reduce pressure on the data warehouse.

In a third manner, the container image instruction may be sent to the scheduled edge computing node based on a load size of the scheduled edge computing cluster.

For example, the container image instruction may be sent to the scheduled edge computing nodes in ascending order based on load sizes of the scheduled edge computing clusters. In other words, the container image instruction is first sent to an edge computing cluster with a low load. In this way, the edge computing cluster with the low load may first download the to-be-updated container image, and the edge computing cluster may quickly download the to-be-updated container image from the data center. When the data center sends the container image instruction to an edge computing cluster with a relatively high load, because the edge computing cluster with the relatively high load has processed its own load for a time period, the load of the edge computing cluster may become relatively low in this case, and the edge computing cluster can also quickly download the to-be-updated container image from the data center.

Optionally, each edge computing node may send a load size of the edge computing node to the data center when the load of the edge computing node changes. The data center determines edge computing nodes belonging to a same edge computing cluster, and obtains a load size of the edge computing cluster based on load sizes of the edge computing nodes belonging to the same edge computing cluster.

For each edge computing node belonging to the same edge computing cluster, the edge computing node sends a load size to a network switching device corresponding to the edge computing cluster. The network switching device sends a message to the data center, and the message includes an address of the network switching device and the load size of the edge computing node. Therefore, the data center may determine, based on the address of the network switching device, each edge computing node belonging to the edge computing cluster.

Optionally, the container image update instruction may further include an identifier of an edge computing node that has requested to download the to-be-updated container image from the data center.

For each scheduled edge computing cluster, the network switching device corresponding to the edge computing cluster receives the container image update instruction, and sends the container image update instruction to each edge computing node in the edge computing cluster.

A sending manner of the network switching device includes broadcast, unicast, and multicast. When the unicast is used, the network switching device sends the container image update instruction to each edge computing node one by one. When the multicast is used, the network switching device groups the edge computing nodes in the edge computing cluster into one or more groups, and multicasts the container image update instruction to each group of edge computing nodes.

Step 202: A first edge computing node receives the container image update instruction, and obtains a performance parameter of each edge computing node in an edge computing cluster in which the first edge computing node is located, where the performance parameter of the edge computing node is used to indicate resource usage of the edge computing node.

The first edge computing node is any edge computing node in the edge computing cluster in which the first edge computing node is located. When receiving the container image update instruction, the first edge computing node may obtain a performance parameter of the first edge computing node, and then broadcast the performance parameter of the first edge computing node to another edge computing node in the edge computing cluster. Like the first edge computing node, another computing node in the edge computing cluster obtains a performance parameter of the edge computing node and broadcasts the performance parameter of the edge computing node after receiving the container image update instruction. Therefore, the first edge computing node may receive the performance parameter of another edge computing node in the edge computing cluster.

Optionally, the performance parameter of the first edge computing node includes at least one of a central processing unit (CPU) idle rate, a memory idle rate, or a delay of the data center of the first edge computing node.

Optionally, after receiving the container image update instruction, the first edge computing node continuously receives, within a time period, the performance parameter sent by another edge computing node in the edge computing cluster, and performs an operation of step 203 after the time period ends. A start moment of the time period is a moment at which the first edge computing node receives the container image update instruction, and a time length of the time period is equal to the preset time length. The first edge computing node may implement the time period by using a timer. During implementation, the first edge computing node starts a timer when receiving the container image update instruction. The timer starts timing from zero. When a timed time period reaches the preset time length, the first edge computing node determines that the time period ends, and performs an operation in the step 203. After receiving the container image update instruction, the network switching device corresponding to the edge computing cluster sends the container image update instruction to each edge computing node in the edge computing cluster. In addition, because the edge computing cluster and the network switching device form a local area network, a network bandwidth between each edge computing node in the edge computing cluster and the network switching device is relatively high, and a time difference between receiving the container image update instruction by each edge computing node in the edge computing cluster is relatively small, which may be basically ignored. Therefore, it may be considered that each edge computing node in the edge computing cluster simultaneously receives the container image update instruction. In this way, each edge computing node in the edge computing cluster simultaneously starts the timer for timing, and simultaneously stop timing.

Step 203: The first edge computing node determines load of each edge computing node based on the performance parameter of each edge computing node in the same edge computing cluster.

For example, for each edge computing node, assuming that the performance parameter of the edge computing node includes a CPU idle rate, a memory idle rate, and a delay between the edge computing node and the data center, the first edge computing node determines load of the edge computing node based on the CPU idle rate, the memory idle rate, and the delay between the edge computing node and the data center according to the following first formula.

$$\text{Score} = W_{cpu} \times CPU_{idle} + W_{mem} \times MEM_{idle} + W_{lat} \frac{1}{LAT}$$

In the first formula, Score is the load of the edge computing node, $CPU_{idle}$ is the CPU idle rate, $MEM_{idle}$ is the memory idle rate, LAT is the delay between the edge computing node and the data center, $W_{cpu}$ is a weight of the CPU idle rate, $W_{mem}$ is a weight of the memory idle rate, $W_{lat}$ is a weight of the delay, and x is a multiplication operation.

Step 204: The first edge computing node sorts edge computing nodes in the same edge computing cluster based on the loads of the edge computing nodes, and selects an edge computing node with the lowest load as an agent node.

Optionally, the first edge computing node may sort the edge computing nodes in descending order based on the loads of the edge computing nodes, and select the last edge computing node as the agent node, in other words, select the edge computing node with the lowest at a current moment load as the agent node in the same cluster. Alternatively, the first edge computing node may sort the edge computing nodes in the edging computing cluster in ascending order based on the loads of edge computing nodes, and select the first edge computing node as the agent node.

Optionally, in addition to the manner of selecting the agent node described in the steps 202 to 204, there may be another manner of selecting the agent node.

In an embodiment, the first edge computing node obtains an identifier of each edge computing node in the edge computing cluster, and selects an edge computing node as the agent node based on the identifier of each edge computing node. A detailed implementation process of this implementation is as follows: When receiving the container image update instruction, the first edge computing node obtains an identifier of the first edge computing node, and broadcasts the identifier of the first edge computing node to another edge computing node in the edge computing cluster. Like the first edge computing node, another edge computing node obtains and broadcasts an identifier of another edge computing node when receiving the container image update instruction. The first edge computing node receives the identifier of another edge computing node, and may select an edge computing node as the agent node based on the identifier of each edge computing node in the edge computing cluster.

In an embodiment, an edge computing node with a smallest identifier or an edge computing node with a largest identifier may be selected as the agent node. Other selection manners are not listed one by one.

In an embodiment, the first edge computing node also continuously receives for a time period after receiving the container image update instruction, and selects, before the first time period ends, an edge computing node as the agent node based on the identifier of each edge computing node in the edge computing cluster.

In an embodiment, when the first edge computing node selects the agent node, the first edge computing node does not belong to any edge computing cluster in the system shown in FIG. 1 or FIG. 2, and the first edge computing node is an edge computing node that is in an edge computing cluster and that has a function of selecting the agent node. Another edge computing node in the edge computing cluster does not have the function of selecting the agent node. In this way, when receiving the image update instruction, the first edge computing node selects an edge computing node as the agent node. For example, the first edge computing node may randomly select an edge computing node as the agent node. In this implementation, when the first edge computing node is not the agent node, the first edge computing node further needs to send a notification message to the selected edge computing node, to notify the edge computing node that the edge computing node is selected as the agent node.

Step 205: When the first edge computing node is the agent node, the first edge computing node obtains, from the data center, a container image corresponding to the identifier of the to-be-updated container image, and sends the container image to another edge computing node in the edge computing cluster.

Optionally, the first edge computing node may download the to-be-updated container image from the data warehouse in the data center. Alternatively, when the container image update instruction includes an identifier of a downloaded edge computing node, the first edge computing node may download the to-be-updated container image from the edge computing node corresponding to the identifier of the edge computing node.

Because the first edge computing node and another computing node are located in a same local area network, a bandwidth between the first edge computing node and another edge computing node is relatively large. Therefore, a time required by the first edge computing node to send the container image to another edge computing node in the edge computing cluster is relatively short.

Step 206 (optional): When the first edge computing node is not the agent node, the first edge computing node receives a container image sent by the agent node.

The agent node downloads, from the data center, the container image corresponding to the identifier of the to-be-updated container image, and sends the container image to another edge computing node in the edge computing cluster. Correspondingly, the first edge computing node receives the container image.

Because the first edge computing node and the agent computing node are located in a same local area network, bandwidth between the first edge computing node and the agent node is relatively large. Therefore, the time required by the first edge computing node to receive the container image sent by the agent node is relatively short.

For example, it is assumed that a size of a container image that needs to be downloaded is 200 MB, a network bandwidth between the network switching device and the data center is 4 Mbps, the edge computing cluster includes four edge computing nodes, and a network bandwidth between any two edge computing nodes in the edge computing cluster is 400 Mbps. In this way, the time required by the first edge computing node to download the container image from the data center is t1=(200×8)/4=400S, and a time period required by the first edge computing node to send the container image to the other three edge computing nodes is t2=(200×8)/400=4S. Therefore, a time required by each edge computing node in the edge computing cluster to obtain the container image is 404s, which is far less than 1600S.

After obtaining the container image, the first edge computing node and another edge computing node in the edge computing cluster may upgrade based on the container image.

Optionally, for another edge computing node other than the agent node in the edge computing cluster, after completing the update of the container image, another edge computing node may send an update complete message to the agent node. When the agent node receives the update complete message sent by another edge computing node and the agent node also completes the update of the container image, the agent node sends an update complete message to the data center. The data center receives the update complete message, to determine that the edge computing cluster completes the upgrade of the to-be-updated container image.

In this application, the agent node is selected, and the container image is obtained from the data center by using the agent node. In this way, the agent node can occupy all network bandwidth between the network switching device and the data center. Therefore, the time required for obtaining image data is relatively short. In addition, because the edge computing cluster in which the agent node is located is a local area network, and the bandwidth between the agent node and another edge computing node in the edge computing cluster is relatively large, the time required by the agent node to send the container image to another edge computing node is relatively short. In this way, the problem that a process of downloading the container image consumes a long time due to the limited network bandwidth of the edge computing node and the data center is resolved.

The foregoing describes in detail the data processing method according to embodiments of this application with reference to FIG. 1 to FIG. 4. The following describes a data processing apparatus and an edge computing node according to embodiments of this application with reference to FIG. 5 and FIG. 6.

Figure 5:
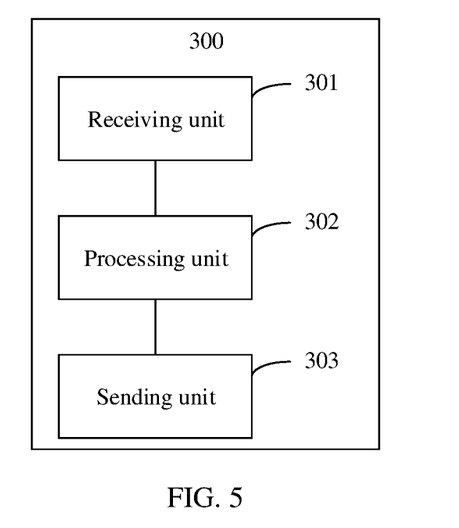
FIG. 5 is a schematic diagram of a structure of a data processing apparatus according to an embodiment of this application.

FIG. 5 is a schematic diagram of a structure of a data processing apparatus 300 according to an embodiment of this application. Referring to FIG. 3, this application provides the data processing apparatus 300. The apparatus 300 includes:

a receiving unit 301, configured to receive a container image update instruction, where the apparatus 300 is any edge computing node in an edge computing cluster, the edge computing cluster includes at least two edge computing nodes, and the container image update instruction is used to instruct the at least two edge computing nodes in the edge computing cluster to update a container image;

a processing unit 302, configured to obtain a to-be-updated container image based on the container image update instruction received by the receiving unit 301; and a sending unit 303, configured to send the to-be-updated container image to another edge computing node in the edge computing cluster based on the to-be-updated container image obtained by the processing unit 302.

Optionally, the processing unit 302 is further configured to:

after the receiving unit 301 receives the container image update instruction, select an edge computing node from the edge computing cluster as an agent node.

Optionally, the processing unit 302 is configured to:

obtain a performance parameter of each edge computing node in the edge computing cluster, where the performance parameter is used to indicate resource usage of each edge computing node;

determine load of each edge computing node based on the performance parameter of each edge computing node; and sort edge computing nodes in the edge computing cluster based on the loads of edge computing nodes; and select an edge computing node with the lowest load as the agent node.

Optionally, for detailed content of selecting the agent node by the processing unit 302, refer to the related content of selecting the agent node by the first edge computing node in the step 202 to the step 204. Details are not repeated herein.

Optionally, the processing unit 302 is configured to:

when the apparatus 300 is used as the agent node in the edge computing cluster, obtain the to-be-updated container image, where the apparatus 300 is the edge computing node with the lowest load.

Optionally, for detailed content of obtaining the container image by the processing unit 302, refer to the related content of obtaining the container image by the first edge computing node in the step 205. Details are not repeated herein.

Optionally, the processing unit 302 is configured to:

randomly select an edge computing node from the edge computing cluster as the agent node; or select an edge computing node as the agent node from the edge computing cluster based on an identifier of the edge computing node.

Optionally, the processing unit 302 is configured to:

when the agent node is not the apparatus 300, obtain the to-be-updated container image from the agent node, where the to-be-updated container image is obtained by the agent node from a data center.

Optionally, for detailed content of obtaining the container image by the processing unit 302 from the agent node, refer to the related content of obtaining the container image by the first edge computing node from the agent node in the step 206. Details are not repeated herein.

Optionally, each edge computing node in the edge computing cluster is connected to the data center through a network switching device.

It should be understood that the apparatus 300 in this application may be implemented through an application-specific integrated circuit (ASIC), or may be implemented through a programmable logic device (PLD). The PLD may be a complex programmable logic device (CPLD), a field-programmable gate array (FPGA), generic array logic (GAL), or any combination thereof. Alternatively, when the data processing method shown in FIG. 4 is implemented by software, the apparatus 300 and modules of the apparatus 300 may be software modules.

The apparatus 300 according to this embodiment may correspondingly perform the method described in the embodiments of the present disclosure. In addition, the foregoing and other operations and/or functions of the units in the apparatus 300 are separately used to implement a corresponding procedure of the method in FIG. 4. For brevity, details are not repeated herein.

In example embodiments of this application, the processing unit selects an agent node, and obtains the container image from the data center by using the agent node. Because the edge computing cluster in which the agent node is located is a local area network, and the bandwidth between the agent node and another edge computing node in the edge computing cluster is relatively large, the time required by the agent node to send the container image to another edge computing node is relatively short. In this way, a problem that a process of downloading the container image consumes a long time due to the limited network bandwidth of the edge computing node and the data center is resolved.

Figure 6:
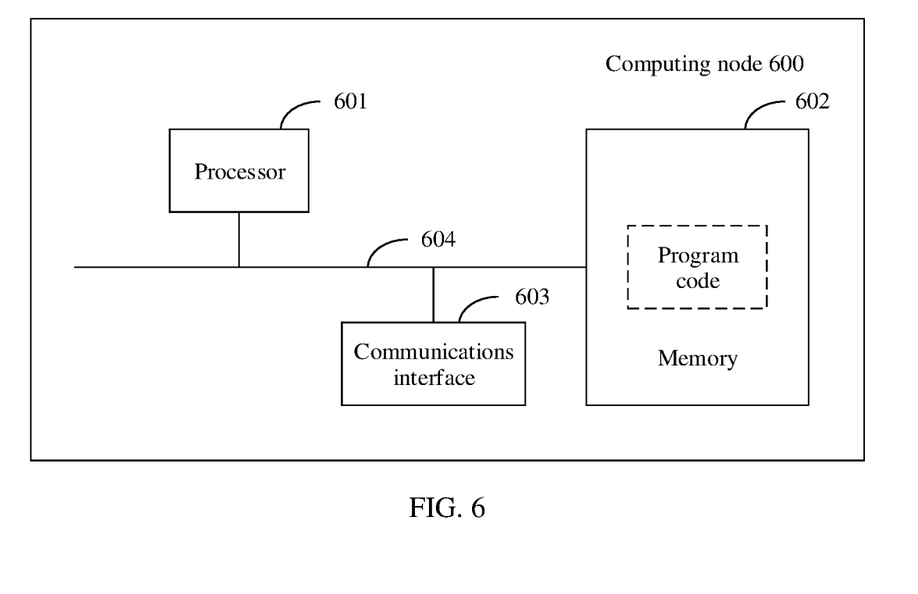
FIG. 6 is a schematic diagram of a structure of a computing node according to an embodiment of this application.

FIG. 6 is a schematic diagram of a structure of a computing node 600 according to an embodiment of this application. As shown in the figure, the computing node 600 includes a processor 601, a memory 602, a communications interface 603, and a bus 604. The processor 601, the memory 602, and the communications interface 603 may implement communication through the bus 604, or may implement communication in another manner such as wireless transmission. The memory 602 is configured to store one or more instructions. The processor 601 is configured to execute the one or more instructions stored in the memory 602. The computing node 600 is any edge computing node 1 in the edge computing cluster 10 shown in FIG. 1 or FIG. 2. The memory 602 stores program code, and the processor 601 may invoke the program code stored in the memory 602 to perform the following operations:

receiving a container image update instruction, where an edge computing cluster includes at least two edge computing nodes, and the container image update instruction is used to instruct the at least two edge computing nodes in the edge computing cluster to update the container image;

obtaining a to-be-updated container image; and sending the to-be-updated container image to another edge computing node in the edge computing cluster through the communications interface 603.

It should be understood that in this application, the processor 601 may be a CPU, or the processor 601 may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or any conventional processor or the like.

The memory 602 may include a read-only memory and a random access memory, and provide an instruction and data to the processor 601. The memory 602 may further include a non-volatile random access memory. For example, the memory 602 may further store information of a device type.

The memory 602 may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. In non-limiting example embodiments, many forms of RAMs may be used, for example, a static random access memory (SRAM), a dynamic random access memory (DRAM), a synchronous dynamic random access memory (SDRAM), a double data rate synchronous dynamic random access memory (double data rate SDRAM, DDR SDRAM), an enhanced synchronous dynamic random access memory (ESDRAM), a synchronous link dynamic random access memory (SLDRAM), and a direct rambus dynamic random access memory (DR RAM).

The bus 604 may further include a power bus, a control bus, a status signal bus, and the like, in addition to a data bus. However, for clear description, various types of buses in the figure are marked as the bus 604.

In this application, the processor in the computing node obtains the to-be-updated container image. Because the edge computing cluster in which the computing node is located is a local area network, a bandwidth between the computing node and another edge computing node in the edge computing cluster is relatively large. In this way, the time required by the processor of the computing node to send the container image to another edge computing node through the communications interface is relatively short. In this way, a problem that a process of downloading the container image consumes a long time because network bandwidth of the edge computing node and a data center is limited is resolved.

This application provides a data processing system. The system includes the data center in FIG. 1 or FIG. 2 and at least one edge computing node. The edge computing node is configured to implement a function of the apparatus in FIG. 5 or the computing node in FIG. 6. The data center and the edge computing node are configured to perform operation steps of a corresponding body in the data processing method in FIG. 4. For brevity, details are not repeated herein.

All or some of the foregoing embodiments may be implemented by software, hardware, firmware, or any combination thereof. When software is used to implement the embodiments, the foregoing embodiments may be implemented completely or partially in a form of a computer program product. The computer program product includes one or more computer instructions. When the computer program instructions are loaded or executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely non-limiting examples of implementations of this application, and are not intended to limit this application. Any modification, equivalent replacement, or improvement made without departing from the spirit and principle of this application should fall within the protection scope of this application.

What is claimed is:

1. A data processing method performed by a plurality of edge computing clusters including a first edge computing cluster and a second edge computing cluster, the first edge computing cluster and the second edge computing cluster each including a plurality of edge computing nodes connected by a local area network, comprising:
receiving, by a first edge computing node and a second edge computing node, a container image update instruction from a remote data center via a public network, wherein the first edge computing node is one of the plurality of edge computing nodes in the first edge computing cluster, the second edge computing node is one of the plurality of edge computing nodes in the second edge computing cluster, the container image update instruction instructs each of the plurality of edge computing nodes in the first edge computing cluster and each of the plurality of edge computing nodes in the second edge computing cluster to update a container image, and the container image is software deployed on each of the plurality of edge computing nodes in the first edge computing cluster and each of the plurality of edge computing nodes in the second edge computing cluster for processing data obtained by the respective edge computing node;
in response to the container image update instruction received from the remote data center, selecting, by each of the first edge computing node and the second edge computing node, an edge computing node from the plurality of edge computing nodes in the respective edge computing cluster as an agent node for the respective edge computing cluster;
obtaining, by the agent node for the first edge computing cluster, a to-be-updated container image from the remote data center via the public network; and
sending, by the agent node for the first edge computing cluster, the obtained to-be-updated container image to another edge computing node in the first edge computing cluster via the local area network,
wherein the agent node for the first edge computing cluster can be any edge computing node within the first edge computing cluster, and said another edge computing node can be any edge computing node within the first edge computing cluster that is not the agent node for the first edge computing cluster.

2. The method of claim 1, wherein selecting, by the first edge computing node, the edge computing node from the plurality of edge computing nodes in the first edge computing cluster as the agent node for the first edge computing cluster comprises:
obtaining, by the first edge computing node, a performance parameter of each edge computing node in the first edge computing cluster, wherein the performance parameter indicates resource usage of the respective edge computing node;
determining, by the first edge computing node, a load of each edge computing node in the first edge computing cluster based on the performance parameter of the respective edge computing node; and
sorting, by the first edge computing node, the plurality of edge computing nodes in the first edge computing cluster based on the loads of these edge computing nodes, and selecting one edge computing node with the lowest load from the plurality of edge computing nodes in the first edge computing cluster as the agent node for the first edge computing cluster.

3. The method of claim 2, wherein the first edge computing node is the edge computing node with the lowest load among the plurality of edge computing nodes in the first edge computing cluster and is selected as the agent node for the first edge computing cluster.

4. The method of claim 1, wherein selecting, by the first edge computing node, the edge computing node from the plurality of edge computing nodes in the first edge computing cluster as the agent node for the first edge computing cluster comprises:
randomly selecting, by the first edge computing node, the edge computing node from the plurality of edge computing nodes in the first edge computing cluster as the agent node for the first edge computing cluster.

5. The method of claim 1, wherein selecting, by the first edge computing node, the edge computing node from the plurality of edge computing nodes in the first edge computing cluster as the agent node for the first edge computing cluster comprises:
selecting, by the first edge computing node, the edge computing node from the plurality of edge computing nodes in the first edge computing cluster as the agent node for the first edge computing cluster based on an identifier of the edge computing node.

6. The method of claim 1, wherein the edge computing node is not the first edge computing node and obtaining the to-be-updated container image comprises:
obtaining, by the first edge computing node, the to-be-updated container image from the agent node for the first edge computing cluster, the to-be-updated container image being obtained by the agent node from the remote data center.

7. The data processing method according to claim 1, wherein the plurality of edge computing nodes are connected to one or more sensors, and each of the plurality of computing nodes is configured to process data collected by the one or more sensors to generate one or more processing results and send the one or more processing results to the remote data center via the public network.

8. The data processing method according to claim 1, wherein the container image update instruction is simultaneously sent from the remote data center to each of the plurality of edge computing clusters.

9. The data processing method according to claim 1, wherein the container image update instruction is sent from the remote data center to the plurality of edge computing clusters in batches at different times respectively.

10. The data processing method according to claim 1, wherein the container image update instruction is sent from the remote data center to the plurality of edge computing clusters respectively in a sequence determined based on loads of the plurality of edge computing clusters.

11. A computing node, comprising at least one processor and a memory, wherein the memory is configured to store computer readable instructions that, when executed by the at least one processor, cause the computing node to perform operations comprising:
receiving a container image update instruction from a remote data center via a public network, wherein the container image update instruction is sent from a remote data center to a plurality of edge computing clusters including a first edge computing cluster and a second edge computing cluster, the first edge computing cluster and the second edge computing cluster each includes a plurality of edge computing nodes connected by a local area network, the computing node is one of the plurality of edge computing nodes in the first edge computing cluster, the container image update instruction instructs each of the plurality of edge computing nodes in the first edge computing cluster and each of the plurality of edge computing nodes in the second edge computing cluster to update a container image, and the container image is software deployed on each of the plurality of edge computing nodes in the first edge computing cluster and each of the plurality of edge computing nodes in the second edge computing cluster for processing data obtained by the respective edge computing node; and in response to the container image update instruction received from the remote data center, selecting an edge computing node from the plurality of edge computing nodes in the first edge computing cluster as an agent node for the first edge computing cluster, wherein another agent node is selected by one of the plurality of edge computing nodes in the second edge computing cluster for the second edge computing cluster, wherein the agent node for the first edge computing cluster is configured to obtain a to-be-updated container image from the remote data center via the public network, and send the obtained to-be-updated container image to another edge computing node in the first edge computing cluster via the local area network, wherein the agent node for the first edge computing cluster can be any edge computing node within the first edge computing cluster, and said another edge computing node can be any edge computing node within the first edge computing cluster that is not the agent node for the first edge computing cluster.

12. The computing node of claim 11, wherein, when executed by the at least one processor, the computer readable instructions further cause the computing node to perform operations comprising:

obtaining a performance parameter of each edge computing node in the first edge computing cluster, wherein the performance parameter indicates resource usage of the respective edge computing node;

determining a load of each edge computing node in the first edge computing cluster based on the performance parameter of the respective edge computing node; and sorting the plurality of edge computing nodes in the first edge computing cluster based on the loads of these edge computing nodes, and selecting one edge computing node with the lowest load from the plurality of edge computing nodes in the first edge computing cluster as the agent node for the first edge computing cluster.

13. The computing node of claim 12, wherein the computing node is the edge computing node with the lowest load among the plurality of edge computing nodes in the first edge computing cluster and is selected as the agent node for the first edge computing cluster.

14. The computing node of claim 11, wherein the edge computing node is randomly selected from the plurality of edge computing nodes in the first edge computing cluster as the agent node for the first edge computing cluster.

15. The computing node of claim 11, wherein the agent node is selected from the plurality of edge computing nodes in the first edge computing cluster as the agent node for the first edge computing cluster based on an identifier of the agent node.

16. The computing node of claim 11, wherein the agent node is not the computing node, and the to-be-updated container image is obtained by the computing node from the agent node, after the agent node obtains the to-be-updated container image from the remote data center via the public network.

17. A non-transitory computer-readable storage medium comprising instructions that, when executed by a computing node, cause the computing node to perform operations comprising:

receiving a container image update instruction from a remote data center via a public network, wherein the container image update instruction is sent from a remote data center to a plurality of edge computing clusters including a first edge computing cluster and a second edge computing cluster, the first edge computing cluster and the second edge computing cluster each includes plurality of edge computing nodes connected by a local area network, the computing node is one of the plurality of edge computing nodes in the first edge computing cluster, the container image update instruction instructs each of the plurality of edge computing nodes in the first edge computing cluster and each of the plurality of edge computing nodes in the second edge computing cluster to update a container image, and the container image is software deployed on each of the plurality of edge computing nodes in the first edge computing cluster and each of the plurality of edge computing nodes in the second edge computing cluster for processing data obtained by the respective edge computing node; and in response to the container image update instruction received from the remote data center, selecting an edge computing node from the plurality of edge computing nodes in the first edge computing cluster as an agent node for the first edge computing cluster, wherein another agent node is selected by one of the plurality of edge computing nodes in the second edge computing cluster for the second edge computing cluster, wherein the agent node for the first edge computing cluster is configured to obtain a to-be-updated container image from the remote data center via the public network, and send the obtained to-be-updated container image to another edge computing node in the first edge computing cluster via the local area network, wherein the agent node for the first edge computing cluster can be any edge computing node within the first edge computing cluster, and said another edge computing node can be any edge computing node within the first edge computing cluster that is not the agent node for the first edge computing cluster.

18. The non-transitory computer-readable storage medium of claim 17, wherein the instructions, when executed by the computing node, further cause the computing node to perform operations comprising:

obtaining a performance parameter of each edge computing node in the first edge computing cluster, wherein the performance parameter indicates resource usage of the respective edge computing node;

determining a load of each edge computing node in the first edge computing cluster based on the performance parameter of the respective edge computing node; and sorting the plurality of edge computing nodes in the first edge computing cluster based on the loads of these edge computing nodes in the first edge computing cluster, and selecting one edge computing node with the lowest load from the plurality of edge computing nodes in the first edge computing cluster as the agent node for the first edge computing cluster.

19. The non-transitory computer-readable storage medium of claim 18, wherein
the computing node is the edge computing node with the lowest load among the plurality of edge computing nodes in the first edge computing cluster and is selected as the agent node for the first edge computing cluster.

20. The non-transitory computer-readable storage medium of claim 17, wherein the agent node for the first edge computing cluster is randomly selected from the plurality of edge computing nodes in the first edge computing cluster as the agent node.

21. The non-transitory computer-readable storage medium of claim 17, wherein
the agent node is selected from the plurality of edge computing nodes in the first edge computing cluster as the agent node for the first edge computing cluster based on an identifier of the agent node.

* * * * *